US006584400B2

(12) United States Patent
Beardsworth

(10) Patent No.: US 6,584,400 B2
(45) Date of Patent: Jun. 24, 2003

(54) SCHEDULE ACTIVATED MANAGEMENT SYSTEM FOR OPTIMIZING AIRCRAFT ARRIVALS AT CONGESTED AIRPORTS

(76) Inventor: Louis J C Beardsworth, Vicarage Farmhouse, Upper Minety, Malmesbury, Wiltshire, SN16 9PY (GB)

( * ) Notice: Subject to any disclaimer, the term of this patent is extended or adjusted under 35 U.S.C. 154(b) by 24 days.

(21) Appl. No.: 10/012,983

(22) Filed: Nov. 6, 2001

(65) Prior Publication Data

US 2002/0177943 A1 Nov. 28, 2002

Related U.S. Application Data

(60) Provisional application No. 60/282,439, filed on Apr. 9, 2001.

(51) Int. Cl.[7] .............................................. G06F 19/00

(52) U.S. Cl. .......................... 701/120; 701/121; 701/3; 701/301

(58) Field of Search ................................ 701/120, 121, 701/122, 3, 16, 301; 705/5, 8, 13

(56) References Cited

U.S. PATENT DOCUMENTS

| | | | | |
|---|---|---|---|---|
| 4,937,743 A | | 6/1990 | Rassman et al. | |
| 5,121,325 A | | 6/1992 | DeJonge | |
| 5,265,023 A | * | 11/1993 | Sokkappa | 701/120 |
| 5,740,047 A | | 4/1998 | Pilley et al. | |
| 5,798,726 A | | 8/1998 | Schuchman et al. | |
| 5,867,804 A | | 2/1999 | Pilley et al. | |
| 6,049,754 A | * | 4/2000 | Beaton et al. | 701/204 |
| 6,134,500 A | | 10/2000 | Tang et al. | |
| 6,161,097 A | | 12/2000 | Glass et al. | |
| 6,182,005 B1 | | 1/2001 | Pilley et al. | |
| 6,282,487 B1 | * | 8/2001 | Shiomi et al. | 701/120 |
| 6,314,361 B1 | * | 11/2001 | Yu et al. | 701/120 |

FOREIGN PATENT DOCUMENTS

| | | | |
|---|---|---|---|
| EP | 1 079 204 A1 | 2/2001 | |
| WO | WO 00/62234 | 10/2000 | |

* cited by examiner

*Primary Examiner*—Michael J. Zanelli
*Assistant Examiner*—Eric M Gibson
(74) *Attorney, Agent, or Firm*—Whitham, Curtis & Christofferson, P.C.

(57) ABSTRACT

A system is provided for managing the inbound flow of aircraft to an airfield by ensuring that aircraft are sequenced before departure into an arrival stream. Sequencing uses operational data obtained from airlines and then provides a methodology for sharing this data with the air traffic control (ATC) agency. The outcome is a daily arrival schedule providing a predetermined operational arrival time for each aircraft movement. The operational data used by the system relates to airline punctuality, taxi times at departure airfields and actual flight times predicted on a flight-by-flight basis by airline flight planning systems. This information is combined to effect a predictive arrival time at a desired navigational fix.

20 Claims, 17 Drawing Sheets

SCHEDULE ACTIVATED MANAGEMENT SYSTEM FOR OPTIMIZING AIRCRAFT ARRIVALS AT CONGESTED AIRPORTS

This patent application claims priority from U.S. provisional application No. 60/282,439 having the same title as the present invention and filed on Apr. 9, 2001.

BACKGROUND OF THE INVENTION

1. Field of the Invention

The present invention generally relates to control of aircraft from flight origination to destination, and more particularly to a collaborative system for scheduling arrivals at destination airports.

2. Background Description

It would not be unfair to say that the most accurate way to describe the general process of arrival management at airfields adheres to a principal of first come first served. The use of this simple method of ordering traffic into a landing pattern is quite adequate when the required capacity to land aircraft is never exceeded by the number of aircraft that at any particular time of day arrive and ask to land.

Unfortunately the latter situation of a capacity which is exceeded at particular times by the number of aircraft which arrive and ask to land is already common and will only become more so as demand for air travel increases and the solution of building additional runways is unacceptable. In reaction to the situation of excess demand airfields will apply a slot process which will crudely limit the number of aircraft planned to fly to the airfield. However this slot will still not have a direct connection with what time the slotted aircraft will be sequenced to land.

Given the current lack of relationship between any slot or the flight's scheduled arrival time (time table) and the time the flight may be landed (i.e. instructed to commence its approach into the destination airfield) the current behaviour of a flight will tend to follow the following pattern: airlines will continue to focus considerable resources at achieving on time departures (in accordance with the time table); the flight from that point onwards is conducted to take every advantage of any opportunity to save time that is considered safe and prudent by the Captain and crew. This pattern can manifest itself as direct routings, increased decent and cruise speeds, and the like. The point to note is that until the aircraft is told by air traffic control (ATC) at the destination airfield that it is commencing its approach it has no idea when it will actually land.

The activity connected with saving time en route has as its purpose getting into the queue to land as soon as possible—not landing itself. It is a curiosity of both the system and the way that punctuality is sold to passengers that considerable resources are currently focused on an on time departure at Standard Time of Departure (STD), but without any clear process for managing the arrival and landing time with comparable certainty. The direct consequence of this is that the arrival process at congested airfields is inefficient for both ATC agencies and airlines.

The consequence of the current system for airlines is that economic and operational inefficiencies are part of normal business. Firstly, time tables provide additional time, beyond actual flight and taxi times required, to allow for delays either airborne or pre-departure. This is known as padding of block times, and produces additional cost because more aircraft are required to cover the same number of services. Secondly, on the day of operation, crew will uplift additional fuel to allow for holding time in the air, be it created by the lengthening of the route by ATC—(lateral holding) or "race track" holding over a navigational fix. This creates cost to the airlines in three ways: 1) if you carry additional weight of fuel the aircraft burns additional fuel to carry it; 2) when you are in a holding pattern you burn additional fuel and incur engineering costs for the time airborne; and 3) if the anticipated holding does not occur, although the airline may have a portion of the residual excess fuel left in the aircraft for the next aircraft sector, it will suffer a cost differential as this fuel will inevitably be more expensive than fuel purchased at the carrier's home airport. In addition, in certain countries the inefficiency described has been recognised as having a level of environmental impact which could be avoided.

For ATC agencies the above described process results in an unmetered and unsorted flow of aircraft that is not matched to any optimal sequence for landing. This will inevitably result in higher workloads for controllers and can adversely affect safety if aircraft arrive in significant bunches. Also, because of the "first come first served" precedent, controllers are obliged to sequence aircraft in a way that inevitably will be inefficient. In summary the current lack of a process that manages the overall flight process is significantly inefficient for all stakeholders in the ATC system.

The aviation industry already recognises that there is a problem to be solved in this area and solutions are being sought. The significant characteristic of all these approaches is that landing slot timing is determined after departure. All current and substantially developed proposed systems who describe themselves as arrival management tools are concerned with sequencing aircraft that are already airborne and in relatively close proximity to the destination airfield (usually within the radar horizon). Some systems only look at aircraft that are already in airborne holding patterns near the airfield and then sequence them as far as the "first come first served" rule will allow. ATC concepts have always looked at how to order the aircraft once in flight on the basis that they will appear in the ATC control zone at the destination airport in a largely random manner. The randomness of the entry of aircraft has always been seen as the ultimate problem. In short, the focus of these systems is to respond as efficiently as possible to the mix of traffic that arrives in the vicinity of the destination airport, by de-bunching and tinkering with the order.

Those systems that intervene in the approach of aircraft before they have reached a race track holding pattern near an airfield do effectively delay the aircraft's approach through lengthening the distance flown. Satellite based information systems can further refine this approach and better enable an airfield ATC to sequence landings. Although this is more cost efficient than racetrack holding it is still far from optimal for the airline. This method is typically used in the United States. Where arrival management tools are applied to the aircraft in the holding stacks the effect is to marginally reduce the time spent holding. Although this confers some level of benefit it still fails to address the inefficiency of building in additional time at the departure end of the flight.

The inadequacies of current and projected approaches to arrival management are encapsulated by their philosophical stance of "doing something to the aircraft" once they are in flight rather than effecting a joint plan before the aircraft departs, where both the ATC agency and the aircraft crew then work toward that plan. As a consequence of this post-departure approach to arrival management there is no opportunity or reason for change in the behaviours of airlines in the conduct of their flights, and also no potential to capture the operational savings on fuel/engineering or better resource management (aircraft utilisation, ground resources and airport stands).

SUMMARY OF THE INVENTION

It is therefore an object of the present invention to provide arrival landing slots (Tactical Arrival Times or "TATs") at the destination airport prior to departure.

It is also an object of the invention to optimize use of the landing capacity at crowded airports.

An object of the invention is to reduce the ATC resources currently expended to respond efficiently to random arrival of aircraft in the ATC control space.

It is another object of the invention to capture operational savings on fuel, engineering services, and improved management of aircraft, ground resources and airport stands.

It is a further object of the invention to provide airlines with means and incentives to optimize the establishment and execution of their flight schedules.

Another object of the invention is to minimize airborne delays, which are built into the difference between gate departure and gate arrival times.

A further object of the invention is to stabilise entry of arriving aircraft into the ATC process.

It is also an object of the invention to provide a stable platform upon which further "gate to gate" refinements can be built.

Another object of the invention is to provide a stable platform of cost and scheduling benefits for users, a platform which will serve as a driver for the airlines which are users of the invention to change their behaviours and practices.

The present invention provides a Schedule Activated Management System (SAMS) to manage the inbound flow of aircraft to an airfield by ensuring that aircraft are pre-sequenced (i.e. before departure) into a uniquely developed arrival stream.

The SAMS process uses operational data derived from airlines and then provides a collaborative methodology for sharing this data with the air traffic control (ATC) agency in such a manner as to negotiate for each flight a Tactical Arrival Time (TAT). The outcome of this collaborative negotiation is a daily arrival schedule providing a predetermined operational arrival time for each aircraft movement. The data used in the SAMS system relates to airline punctuality, taxi times at departure airfields and actual flight times predicted on a flight-by-flight basis by airline flight planning systems. This information is combined to effect a predictive arrival time at a desired navigational fix. When used in conjunction with an optimised sequencing process for the final arrival time, the system then creates a TAT for an individual flight. Furthermore, although TATs will be issued prior to departure for all aircraft at a SAMS compliant airport, the system can also incorporate tactical updates to the TATs via ground to aircraft data or voice communications. A pre-departure only version would be considered a "basic SAMS system." With the development and incorporation of a tactical update module the system would be considered an "advanced SAMS system".

Arrival delays are highly predictable through effective modeling. Furthermore, the entry of aircraft into the ATC process is stabilised by agreeing on a TAT and consequently agreeing on a fixed departure time. This combination of a TAT issued prior to departure and a fixed departure time is novel. In the past users of the ATC system have not been involved in this form of collaborative management process—in effect a joint decision between the airline users and the ATC.

The method of the invention optimizes aircraft arrivals at congested airports by obtaining basic flight information for all flights scheduled to arrive at an airport during a specified operational period, this information including for each flight a flight number and a requested Tactical Arrival Time (TAT); creating from this basic flight information target TATs for each flight; offering these target TATs to the airlines controlling these flights; negotiating with the airlines until there is acceptance of TATs for these flights; and then issuing final TATs, each TAT for a flight being issued prior to departure of the flight. Airlines share proportionally in a measure of departures from requested TATs, such measures being optionally weighted.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
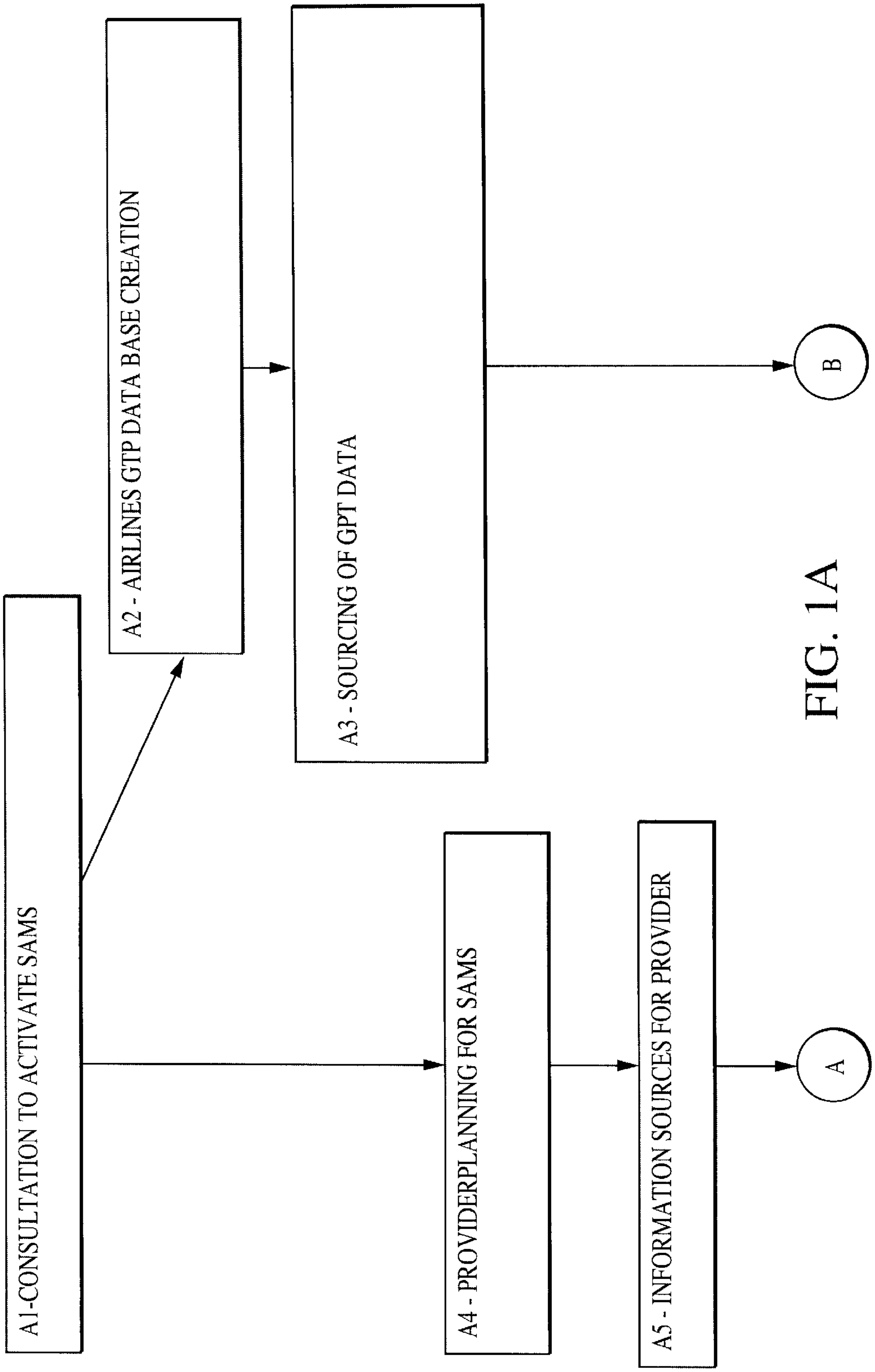
FIGS. 1A through 1F are a flow chart showing the method of the invention in its best mode of implementation, beginning with establishment of the SAMS operation (FIG. 1A), and continuing through creating data bases and education processes (FIG. 1B), on the day operation (FIG. 1C), that TAT allocation process (FIGS. 1D and 1E), and operation to landing (FIG. 1F).
Figure 1B:
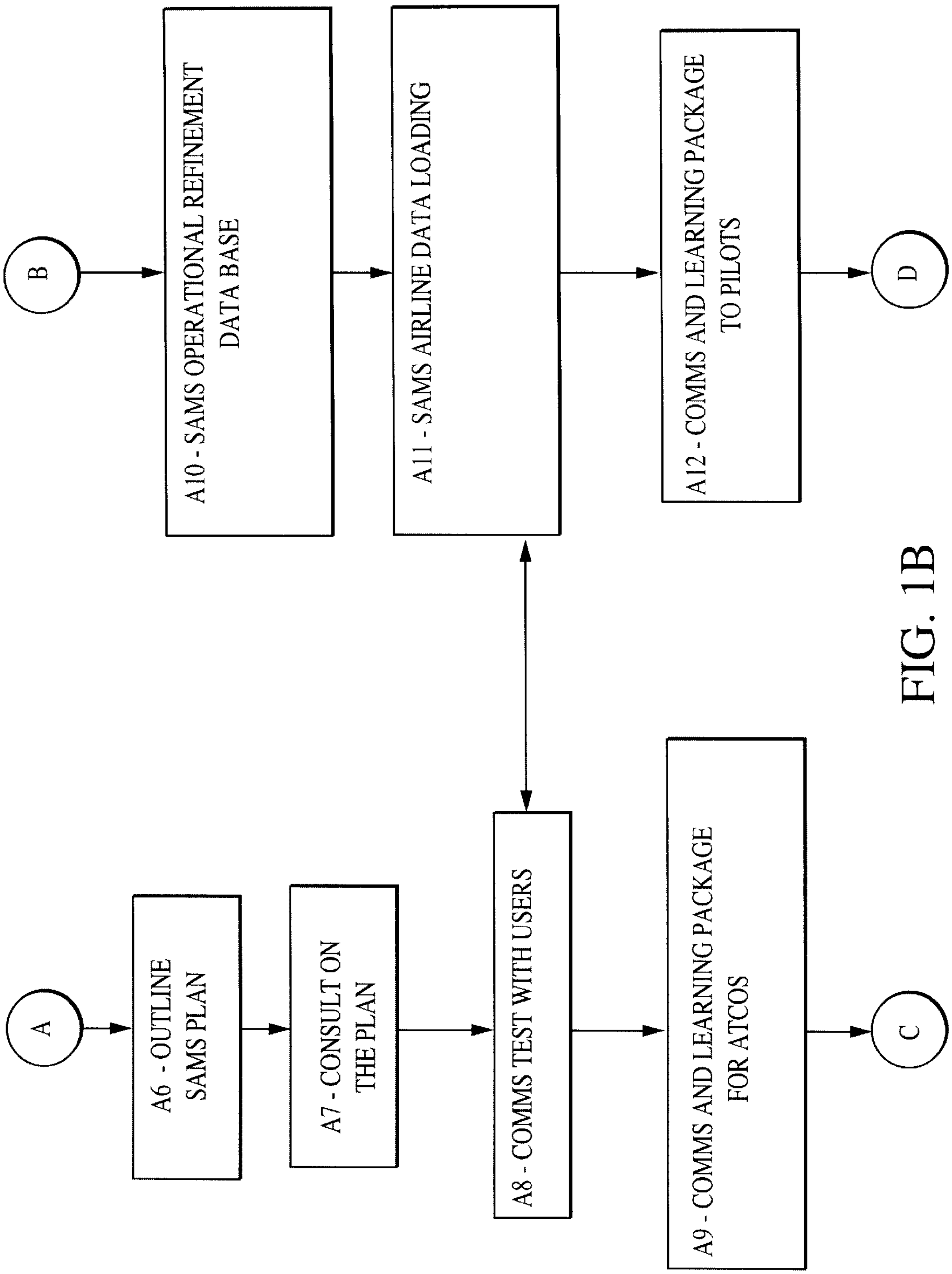
Figure 1C:
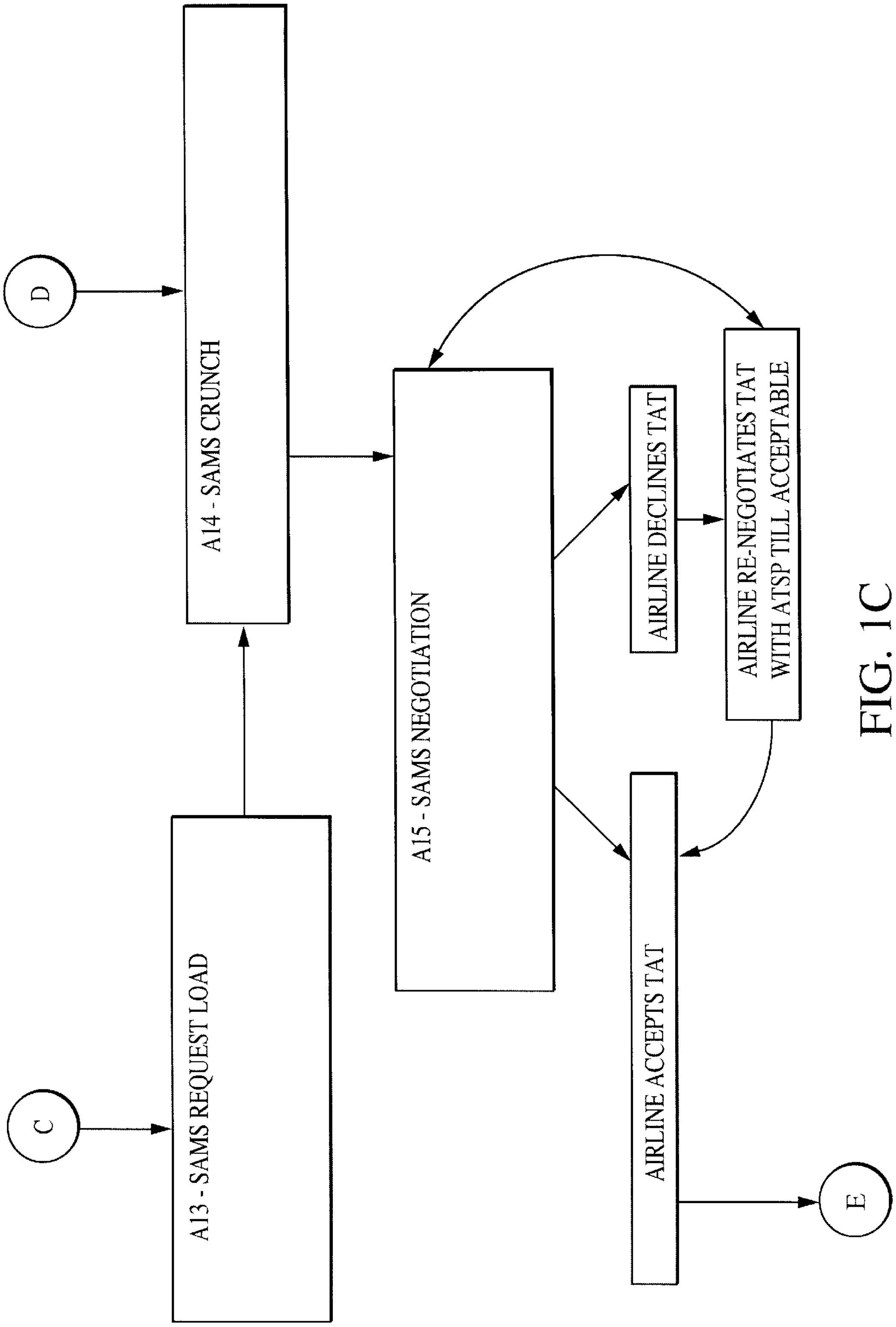
Figure 1D:
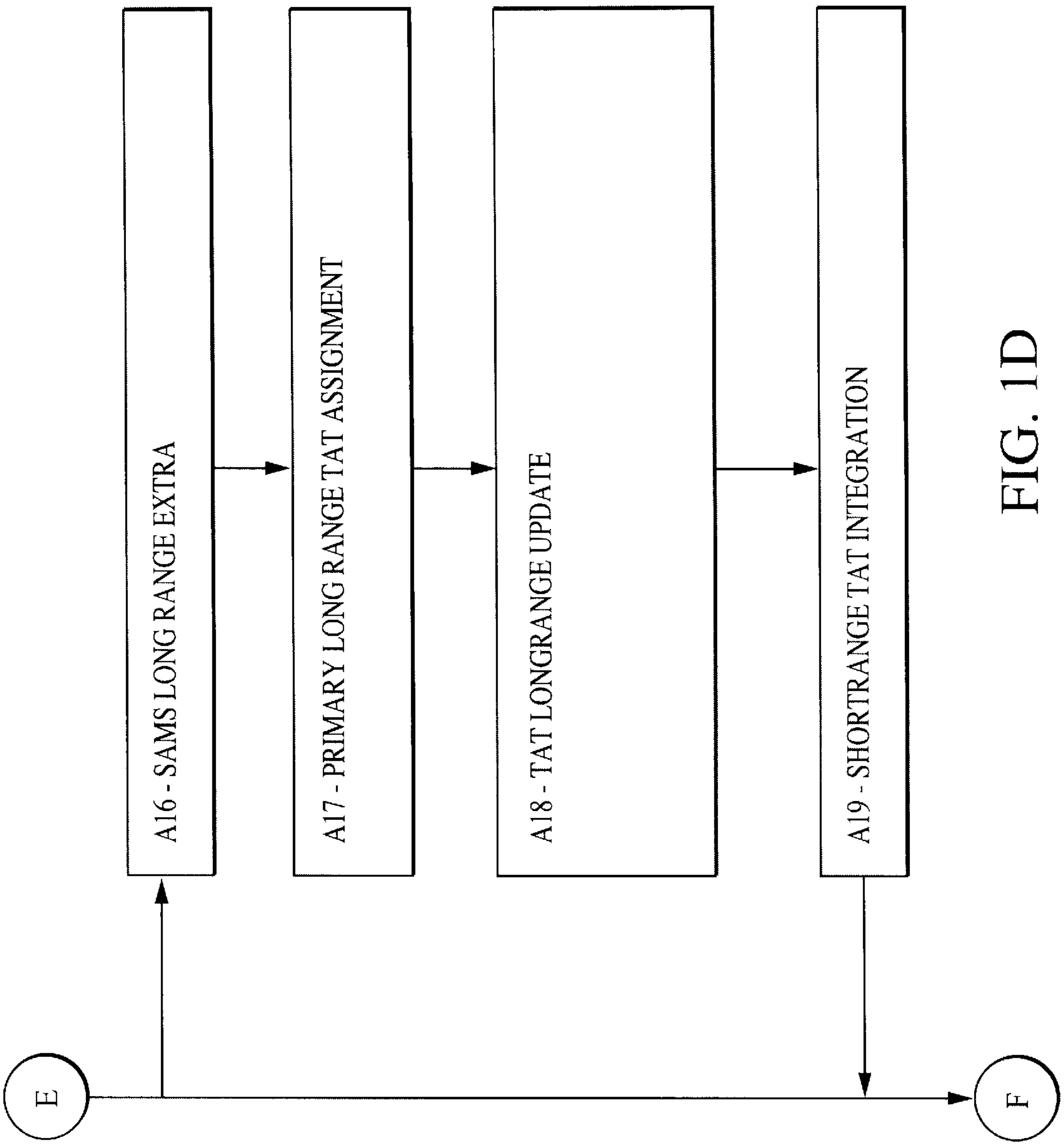
Figure 1E:
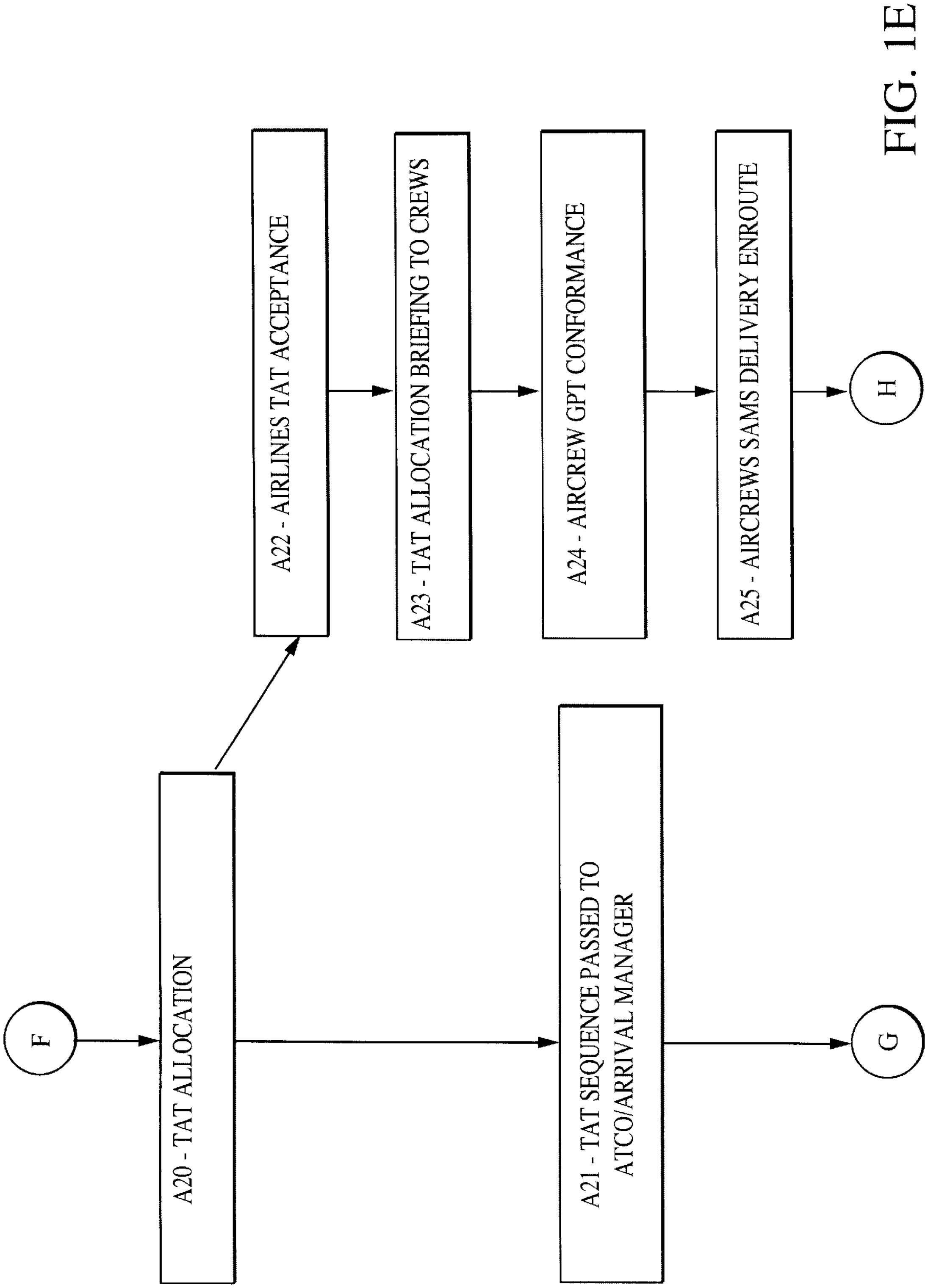
Figure 1F:
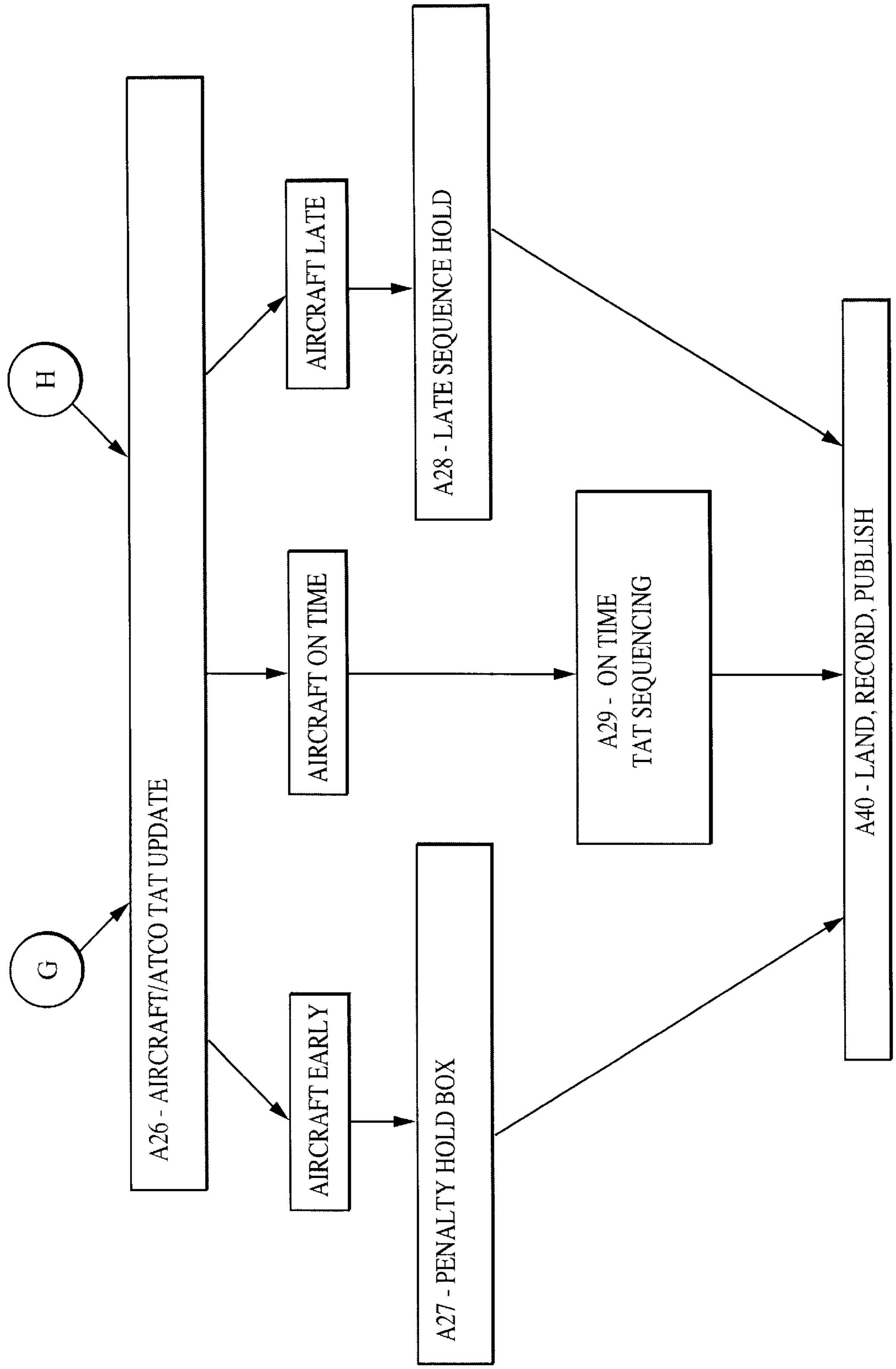

The following glossary will be used in describing the invention:

| | |
|---|---|
| Aircrew | Aircraft crew involved in execution of technical aspects of flight (e.g. Captain, Co-pilot, Flight Engineer). |
| ATCO(s) | Air Traffic Control Officer-individual(s) responsible for management of aircraft. |
| ANSP(s) | Air Traffic Service Provider-can be applied to either an air traffic agency or a provider airport authority. |
| Gate to Gate | Refers to view of total aircraft journey process from departure parking position to arrival parking position. |
| GPT | Ground Progress Time-the estimate of time required before any departing aircraft will be ready to take off. |
| Hold(ing) | Delaying process for aircraft awaiting or being positioned into a landing sequence. |
| SAMS | Schedule Activated Management System. |
| Schedule | Activity of aircraft suggested by a time table or operational plan. |
| Slot | Nominated sequencing time for an aircraft; may be issued either by an airport authority related to the Aright to land at@ that airport, or by an ATC agency as a time band for |

-continued

| | |
|---|---|
| | an aircraft to be at a certain point in space. |
| STD | Standard Time of Departure-time published by an airline at which the aircraft will leave the parking position. |
| Taxi Times | Time required from leaving the parking position for the aircraft to reach the take off position. |

Referring now to the drawings, and more particularly to FIGS. 1A through 1F, there is shown an overall flow chart of steps A1 through A30 for a best mode of implementing the invention. Preliminarily, (A1) an ANSP in Consultation with users decides that an airfield should become SAMS compliant, or Users request that the airfield become SAMS compliant. (A2) Airline ("users") establishes databases to determine GPTs to be applied to each flight number. The GPT is the addition of two airline derived elements of time, one related to airline punctuality the other to taxi time for expected runway in use. As noted in block (A3), punctuality can be derived from any data source such as ACARS, company estimates, historical airport or ATC data or company targets. Taxi time will normally be derived from a similar data source or could be averaged information. Orientation of projected departure runway will be assessed from either meteorological data on the day, requirements created by local noise control regulations or from statistical information.

(A4) ANSP examines historical flight demand planned verses actual traffic patterns and from this creates in its data base an outline of optimal arrival distribution based on reducing the number of large wake vortex separation events. This is used as a template for ANSPs SAMS software to configure TATs requested by airline users. As noted in block (A5), data can be drawn from historical records, airport slot information, timetable information, or created on a day by day basis from TAT requests. (A6) The output of the system at this point in the planning process is a basic map of an optimised arrival sequence.

(A7) ANSP then consults with users to establish process and verify planning assumptions. (A8) ANSP works with airlines to establish and test communication systems. (A9) ANSP provides communication and education package to ATCOs and if appropriate liaise with other control agencies. (A10) In addition to examining elements of GPT a further database is created of correction times to be applied to departure routes on the basis of the difference between actual and planned distance to be flown. (A11) Individual airlines load database into SAMS software. This includes the calculation of the variability of flight time for the SAMS message to be sent to the ANSP. SAMS allows for this to be fixed on a flight time/aircraft type basis or variable on the day. Also at this stage airlines integrate flight planning systems into their system.

(A12) Airlines produce individual technical packages and communication to cockpit crews. This will include outline of system operation, technical management, production of detailed cockpit procedures. (A13) TAT requests are provided to the ANSP a minimum of four hours before operations commence for any flight whose destination is the SAMS compliant airport. This requirement can be satisfied if 1) all airlines provide the ANSP with a SAMS message for each flight scheduled during the next day of operation; 2) airlines may opt to use a repeating SAMS message that is only modified/updated on a periodic basis; or 3) in the event that a airline declines to pass a SAMS message the ANSP may impose a TAT by reference to the historical information. (A14) The ANSP receives the SAMS messages including the requested company TATs. These are then processed by the system, which compares requests to ideal sequences and looks for the best match to produce blocks of pre-sequenced aircraft of the same wake vortex types. The model sequence contains an over booking profile to allow for perturbations. (A15) The ANSP offers TATs to airlines on the basis of the following priority: 1) as requested; 2) within the parameters declared by the airline; or 3) later than the parameters offered by the airline.

(A16) In the event that the airfield handles long range arriving aircraft the process of building the arrival sequence of TATs will vary in the following way. (A17) Long range departures will be allocated provisional TATs based on producing blocks of heavy classification wake vortex aircraft. The timing of these blocks will be built up around the optimal projected sequence for the planned traffic sequence taking account of the expected short haul traffic (short range). (A18) Given that long range aircraft will have their initial TATs issued based on the weather predicted prior to the calculation of that of the short range aircraft an update process is initiated. At a predetermined distance from the SAMS compliant airfield (for example at the entry to the North Atlantic Track system for aircraft inbound to Western Europe) long range aircraft pass an updated TAT request. The pre-departure TAT allocation process is repeated and the aircraft either 1) have their original TAT confirmed or 2) are issued a new TAT to fit them into a revised sequence.

(A19) When short range TATs are received they are processed in the normal way but are built up around the blocks of long range (heavy) aircraft. (A20) Based on the provisional sequence created as described above, the ANSP then passes the TATs matched to flight numbers back to the airlines with all airlines receiving a list of all TATs allocated for the period of operation. The period of operation would normally be the primary operating hours of the airfield, typically 0400–2300 (local time). However with airfields in locations remote from population centers this period may be extended to a 24 hour rolling period. (A21) The sequence is also passed to ATCOs who can then anticipate TATs that will be declared by incoming aircraft. When the SAMS system is used in coordination with an arrival management tool built into the ATC computer system the TATs can also be preloaded so that they provide a rule guide for the final sequencing management of traffic. On arrival in the designated ATC sector for the airfield aircraft will confirm their TAT with ATC.

(A22) Once confirmed as final allocation the airline making a flight may then treat the TAT as its own. It may then swap TATs between aircraft of the same wake vortex type, or trade TATs with other users.

(A23) Aircrew are issued with TAT before departure and usually as part of the pre-flight briefing process. This is a vital and unique virtue of the SAMS system as the prior knowledge of TAT at the fuel planning stage enables the crew to avoid the loading of unnecessary fuel that previously would have been carried to meet unknown holding delays. (A24) Crew will then manage the departure and taxi of the aircraft to arrive at the take off position at a time equivalent to the total of the GPT after STD. (A25) Aircraft departs at the requested time and crew then manage the en-route phase to achieve the TAT. All methods of en-route speed management are useable with SAMS, with the only proviso being that normal procedures are followed with ATC. All flights are required to file a flight plan when flying in controlled airspace, or if required by State law. As part of the flight plan a speed will be stated for the cruise portion of the flight. It is permitted to deviate by up to 10% from the is speed without notifying ATC. If a change in altitude is required to facilitate a speed change this must always be agreed with ATC. (A26) When the aircraft arrives at terminal sector boundary it declares the TAT together with its estimate for on time plus or minus a number of minutes. It should then be possible for the ATCO to give an indication of final time off initial fix if required.

(A27) Unless there is a space in the landing sequence created by a late aircraft, an early aircraft will be held for up to a predetermined number of minutes (e.g. 15) The exact number will be determined based on average holding for each airfield under congested conditions. (A28) Aircraft will be landed as soon as possible as no aircraft will deliberately be late. An on time aircraft will land in its assigned sequence, in preference to an early aircraft which will be sequenced into the first available gap in the landing sequence or held until they reach their pre-assigned TAT. Late aircraft may however still expect to hold in anticipation of a gap in the flow, but will be given preference to an early aircraft since being early—arriving in advance of your TAT—is considered to be trying to beat the requirements of the system.

(A29) Aircraft are sequenced into landing flow based on optimal tactical sequence after executing no more than one holding pattern. The aim of the sequencing will be to ensure that the logic of SAMS is followed as far as possible and that the controller bunches aircraft into blocks of the same wake vortex types, which reduces holding delay by making the sequencing more efficient and generating additional landing slots. In the event that an unplanned perturbation occurs, e.g. bad weather or a blocked runway, then the airfield will execute a pre-agreed procedure of reverting to current holding procedures. This form of pre-agreement will be developed through a Quality Of Service measure or Service Level Agreement. (A30) The aircraft is landed, and the achieved time at TAT fix is recorded and made available to all users.

Figure 2A:
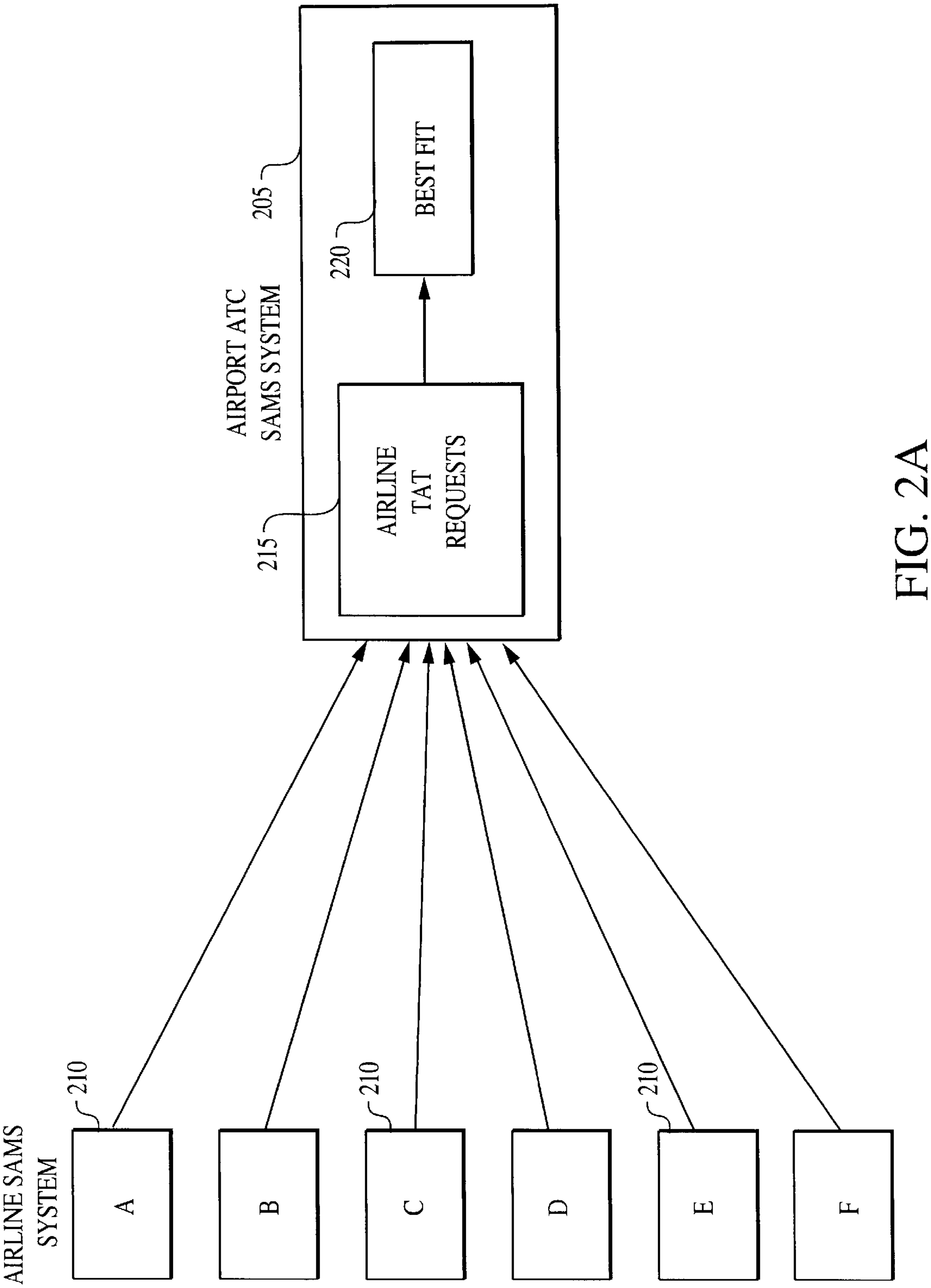
FIGS. 2A through 2D describe the steps in the communication between airlines and an air traffic control authority to establish TATs.
Figure 2B:
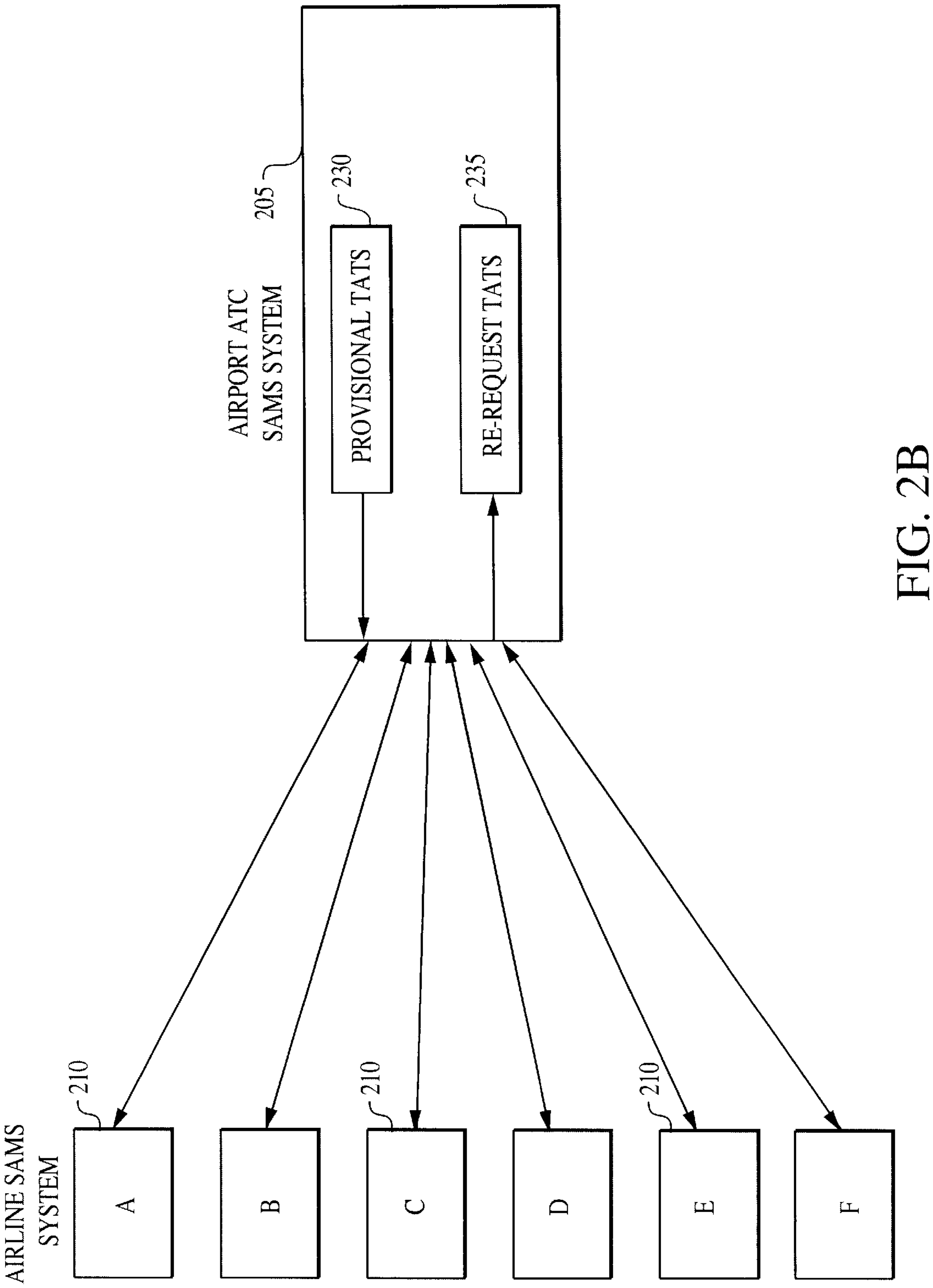
Figure 2C:
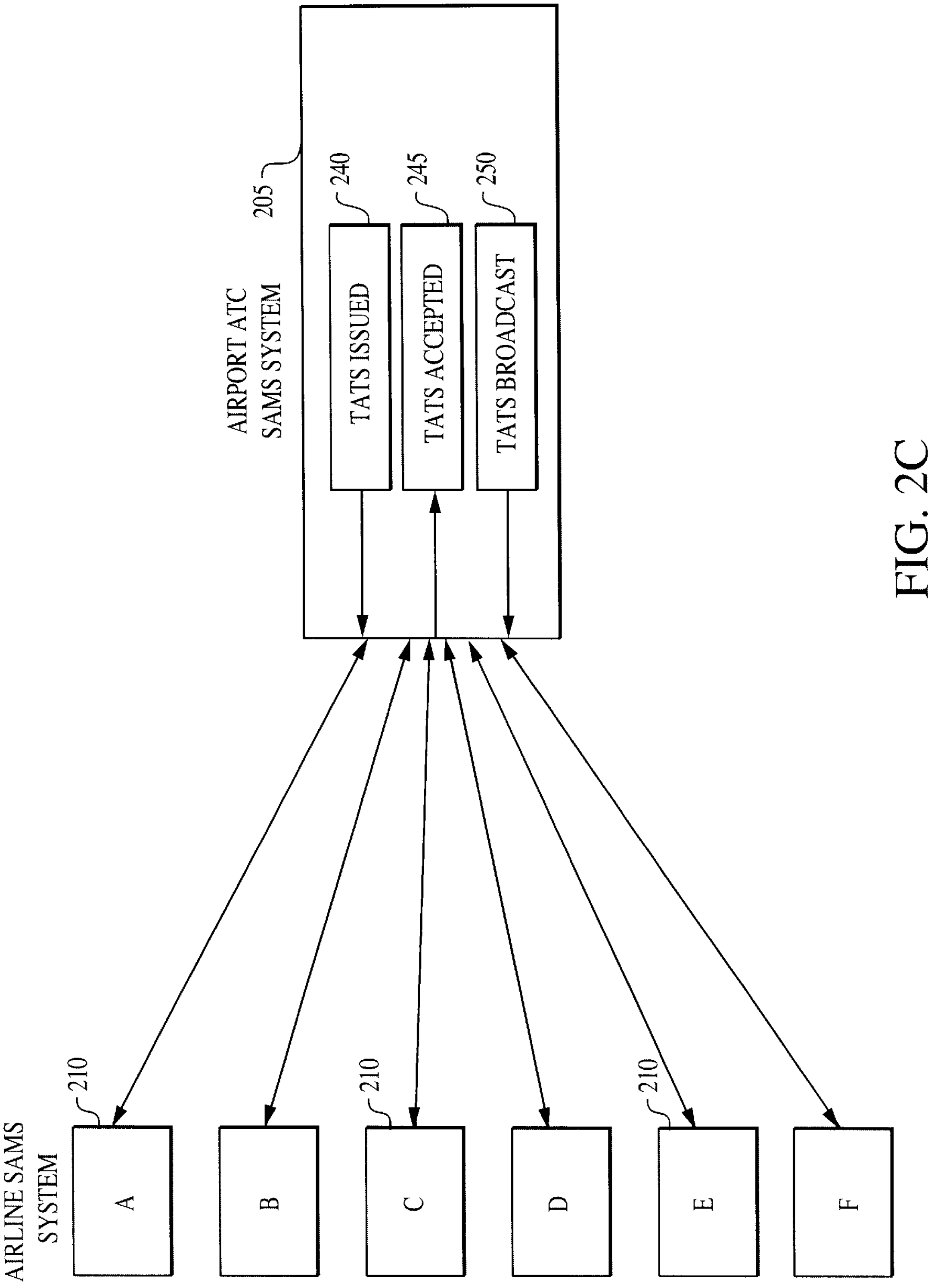

Turning now to FIGS. 2A through 2D, there is shown the steps in the communication process between airlines and an airport traffic control (ATC) authority. As shown in FIG. 2A, airlines 210 pass their TAT requests 215 to the ATC system 205. Each TAT request contains four pieces of information: the aircraft flight number, the specific TAT requested by the airline, a time flexibility range (+/−minutes on TAT), and the wake vortex type of the aircraft (for example: heavy, medium, light). These are processed by the ATC looking at best fit 220 against an optimal arrival sequence as defined by a collaborative negotiation between the ATC and the airlines. Provisional TATs 230 are then issued, as shown in FIG. 2B, not less than four hours before the first flight of the operational period. On receipt of the TAT from the ATC the airline either accepts or declines the TAT. If it declines the TAT it resubmits another TAT request 235 for this aircraft. Issued TATs 240 will either be as requested by the airline, or within the speed/range variation (i.e. the time flexibility) given by the airline or operator. This process is repeated as necessary. As shown in FIG. 2C, when final agreement is reached and all TATs have been accepted 245 the airport then makes the TATs, as established and accepted, available 250 to all airport users. These are then available to be issued to operating pilots prior to flight.

Figure 2D:
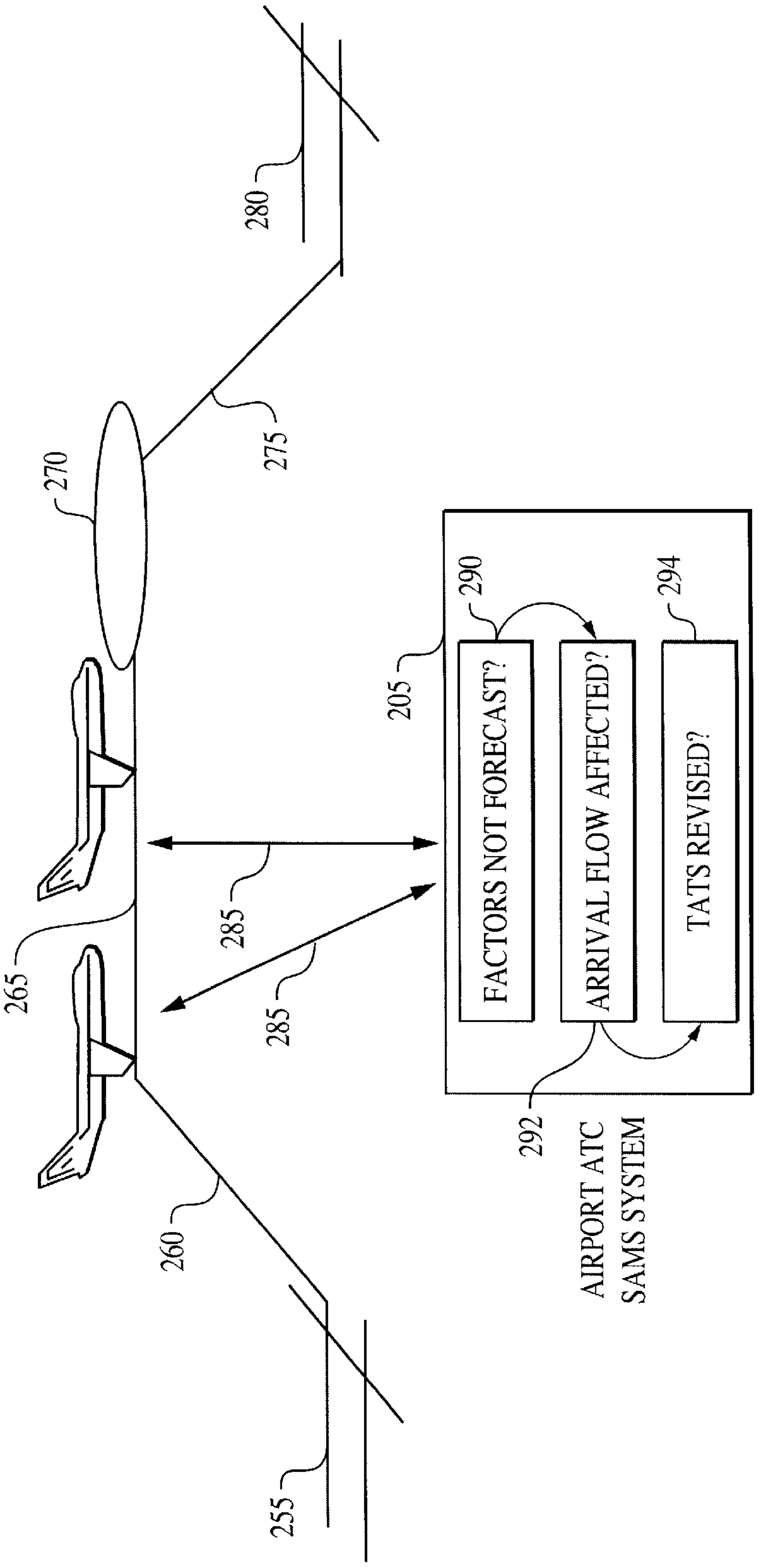

The use and updating of TATs may be described with reference to FIG. 2D. There is a time period 255 between push off from the gate and takeoff, a climb 260 to altitude, and then cruising 265 to a navigational fix 270, followed by descent 275 and landing, with a time period 280 between landing and arrival at the destination gate. Once the aircraft are in flight it is possible to revise TATs using the same speed variation parameters as were used to determine the initial TATs. However, revisions 294 would only be carried out in the event that factors not forecast 290 affected the arrival flow 292. Note that the airport SAMS system communicates 285 with aircraft in flight using air/ground data or voice to update TATs if required.

Allocation of TATs

At the planning stage for the SAMS sequence for a particular operational period, the ATC will have been passed the TAT request for all operators and flights. In the event that no information is provided for a flight that is know to be operating that day, a TAT will still be created as previously described. Before the airlines can be issued their provisional TATs the SAMS system must create a sequence into which the flights can be put and the TATs derived.

Figure 3A:
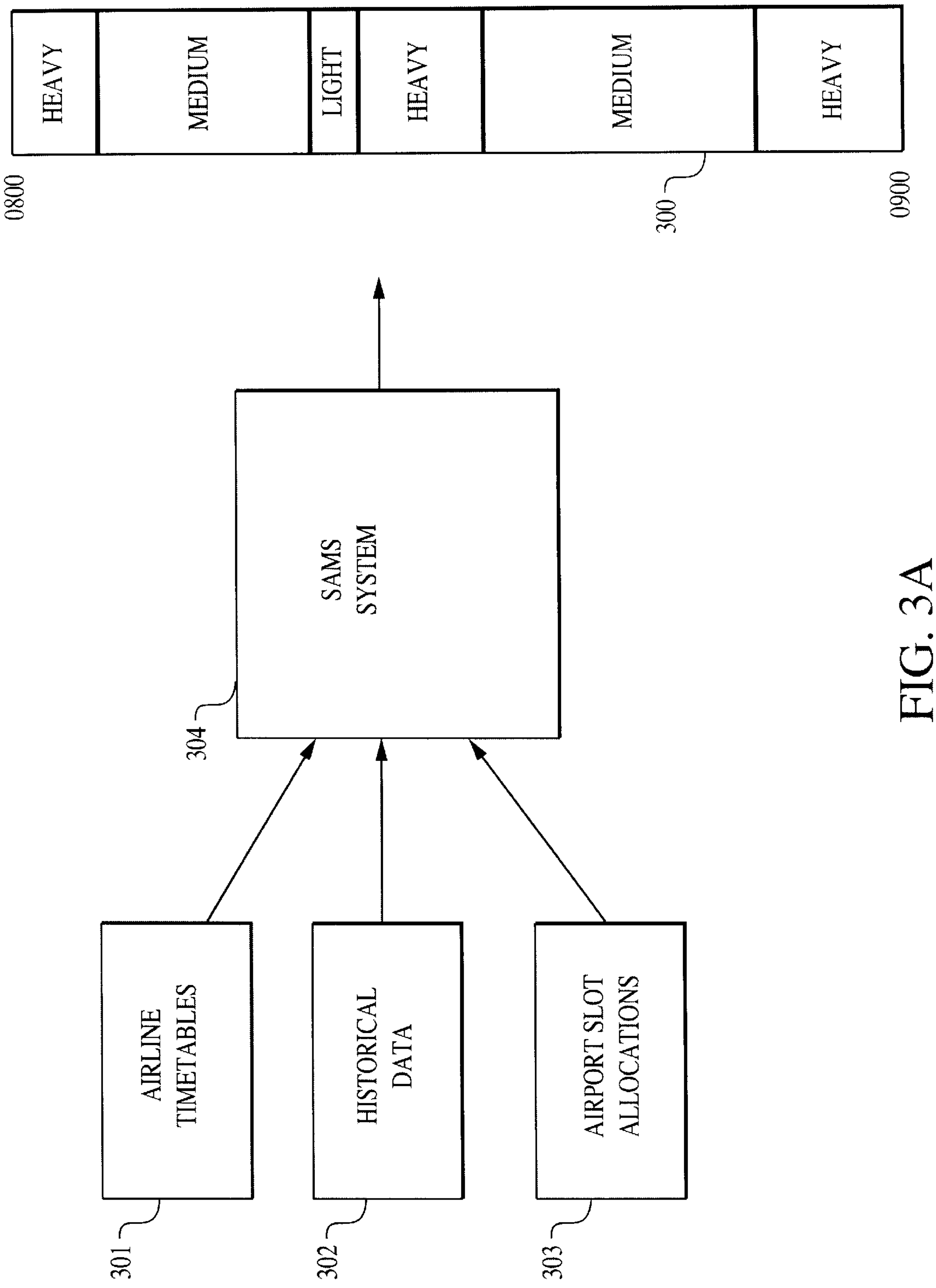
FIGS. 3A through 3G describe how TAT requests are optimally used in allocating TATs against a template.

The process of creating the TAT sequence begins with a model generated by the allocating system software, or alternatively through the use of a paper based process. As shown in FIG. 3A, this model 300 will have in it a theoretical sequence of aircraft by TATs derived from a combination of airline timetables 301, airport slots 303 (if applicable) and historical arrival patterns 302. Prior experience data provides a guide to the likely mix of traffic, and makes it possible not only to aim at a pre-optimized arrival sequence but also to predict what the gains will be at the airport in terms of additional slots. The model 300 will be a template for sequencing of the aircraft into blocks of like-wake vortex types (as shown in item 300 in FIG. 3A) which will provide a first level of processing for the incoming TATs. This model 300 serves as a template for the allocation of TATs on any operational day. For the purposes of illustration, the model 300 shown in FIGS. 3A through 3F shows a one hour time period from 0800 to 0900, divided into wake vortex blocks. For simplicity, three wake vortex types (Heavy, Medium and Light) are shown, although in actual practice more than three wake vortex types are used.

The allocation of TATs with the associated grouping of like wake vortex aircraft is a key process in realising the benefits that SAMS is able to produce. The SAMS approach to arrival management is driven by the overall efficiency of the total arrival process. This benefits all users for the reasons stated above—primarily, the carrier efficiencies which are enabled by pre-departure TATs. In achieving this outcome the system needs to be transparent in both its processes and the outcomes of them to ensure that all users can have confidence in its fairness.

Figure 3B:
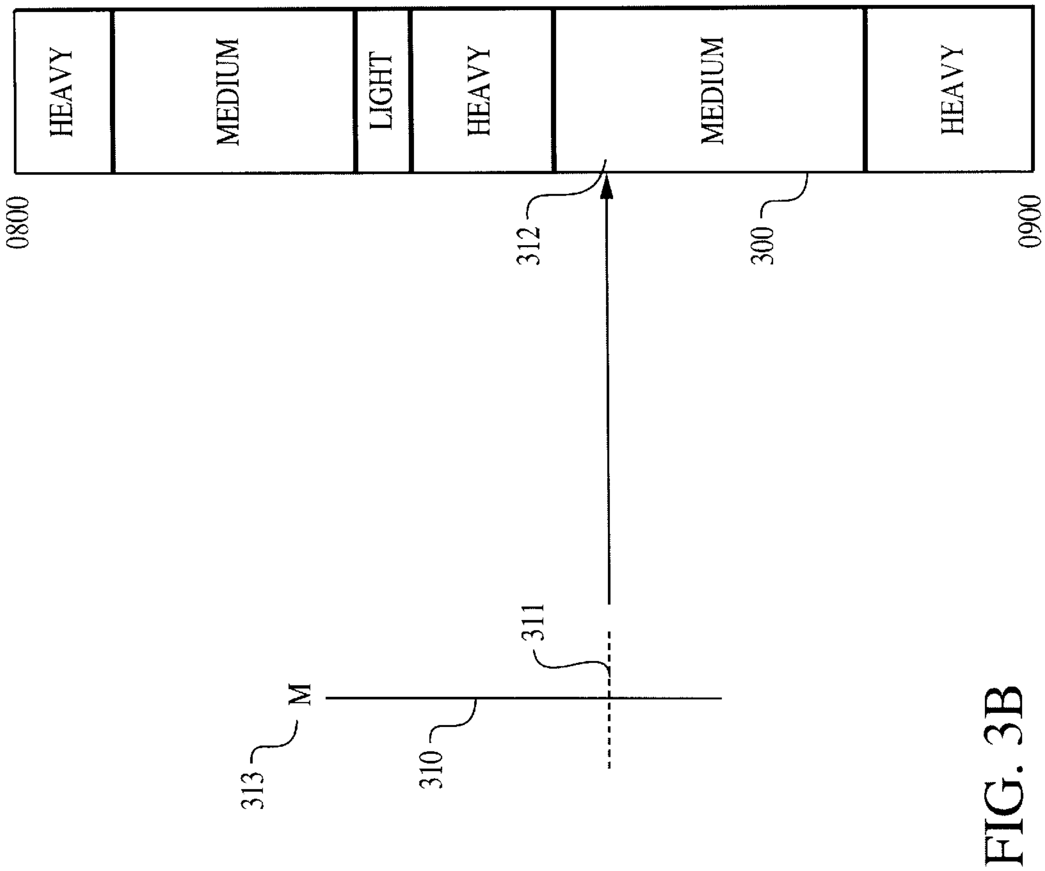

The first step in the allocation of TATs is the receipt of the SAMS message shown in FIG. 3B. The message contains the wake vortex type 313 (represented by a letter, in this example "M" for "Medium") of the aircraft, the requested TAT 311 (shown by a horizontal dotted line in FIG. 3B), and the time window 310 created by the ability of the aircraft to vary its cruise speed within predetermined parameters. The requested TAT 311 is a time, illustrated in FIG. 3B by an intersection at some point 312 on the model 300 between 0800 hours and 0900 hours.

The allocation system will first test to see whether all the requested TATs can be satisfied, but this outcome is unlikely in an airport and time frame which is crowded and for which the SAMS process provides a solution to overcrowding. In solving overcrowding, the logic of the SAMS system tries to create "packets" of aircraft of the same wake vortex type. This minimizes the additional time and distance separation required for lighter aircraft to follow heavier aircraft in a landing corridor, thus permitting more landings within the same time frame. However, the consequence of creating "packets" is that some aircraft may have requested TATs that are within the time packet of another vortex type, and therefore cannot be satisfied. Once this has been determined, the system will use the time flexibility provided in the TAT request message to find an alternate TAT consistent with the request.

The resulting increase in the capacity of a SAMS compliant airport to handle arrival traffic needs to be balanced against the competitive needs of the airline users of the SAMS system. The system must be fair, and be seen to be fair by the airlines participating in the SAMS collaborative process. To achieve this SAMS provides a measure of departures from requested TATs, such that over time this measure is shared proportionally by the users. For example, a suitable measure of departures from requested TATs for an airline could be the average number of minutes per flight. That is, if an airline landed three aircraft and one of them was given a TAT thirty minutes later than the requested TAT that would be an average of ten minutes per arriving flight. This measure is incorporated into the SAMS logic in such a fashion that, over time, it will be more or less the same for each airline user.

Optionally, this measure may be weighted by the number of passengers, or the number of passenger miles, associated with the arriving flights. In this event the departure in minutes from the requested TAT would be multiplied by the number of passengers affected, or the number of passenger miles affected, and this figure would be averaged over the total number of passengers, or passenger miles, for an airline's flights which arrive at the airport. Similar measures will be evident to those skilled in the art.

Ensuring fairness would also work at other levels. Carriers typically have competitive schedules which promulgate the same arrival times. Clearly it is not possible to land at the same time so where there are competing TATs a simple rotating priority could be applied. A further option to equalize the measure would be to shuffle the sequence of flights within a packet. Still another approach would be to set up a market among the airlines for the purchase and sale of units of the measure in order to achieve parity.

The SAMS messages received by the ATC agency from the airline contains a span of possible arrival times, derived by the airline from its own information. The TAT flexibility that is given by the airline shows the variation in arrival time at the nominated fix that can be achieved by the aircraft within the flight envelope described by the normal flight planned route. Within this span will lie the airline's preferred TAT. If a TAT is eventually issued by the ATC agency that is other than that requested by the airline, but within the width of TAT flexibility, the crew operating the aircraft will then be able to meet the assigned TAT by making adjustments within the flight envelope or varying the planned departure time. Ultimately, it is anticipated that once SAMS is established and the TATs become stable at the destination airports, the airlines will plan their flights to leave later in the time tables. That is, departure time will be derived from an arrival time, a novel but logical result enabled by the pre-departure allocation of TATs.

TAT messages are received from airlines and other aircraft operators. These messages provide the SAMS system with the three pieces of data that are required to sequence the aircraft and then allocate TATs. These are: requested TAT, time flexibility range and wake vortex type. This information is represented diagrammatically in FIG. 3B by a vertical bar 310 representing a period of time covering the flexibility range, a horizontal bar 311 indicating the requested TAT within the time period and the letter 313 of the wake vortex type. Although the full range of wake vortex types is normally five or six, the diagrams illustrate three (H for heavy, M for medium and L for light) to simplify the discussion.

Figure 3C:
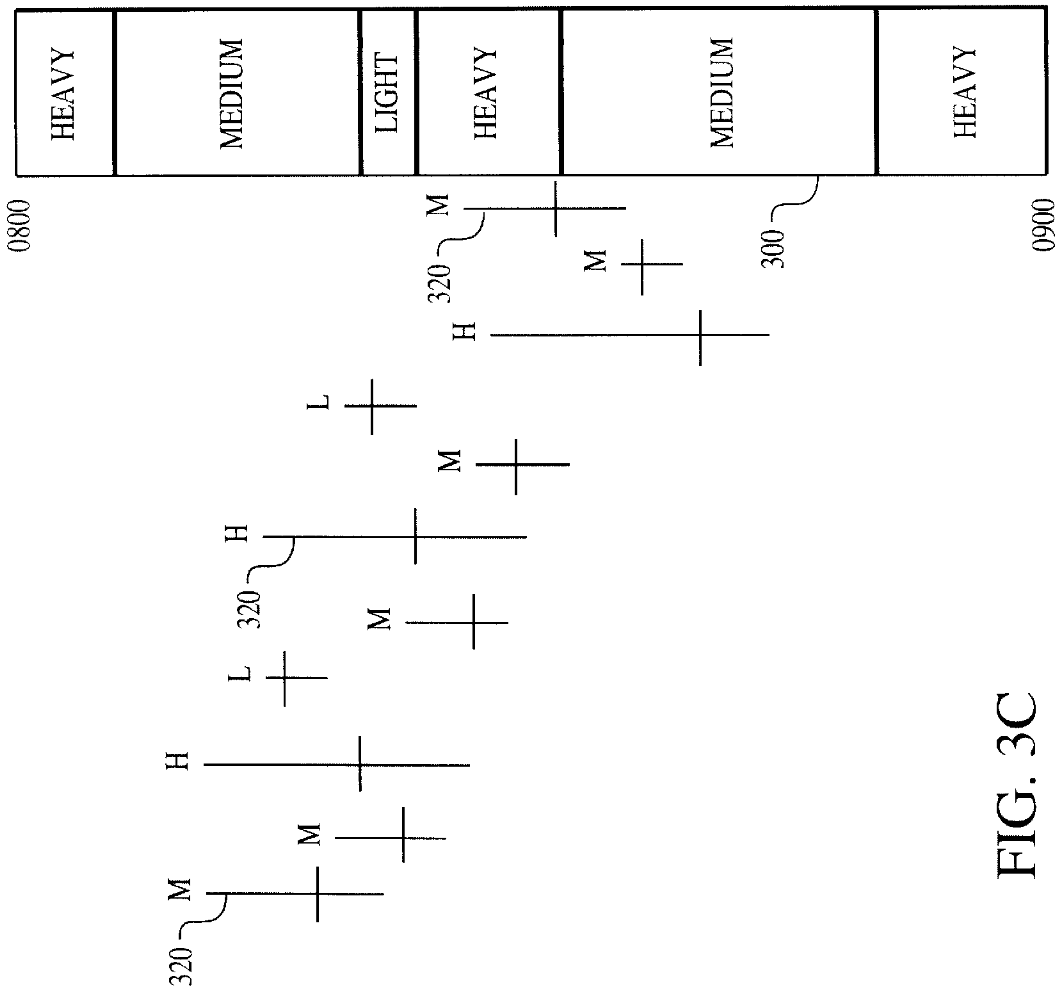

An illustrative set of messages 320 is shown diagrammatically in FIG. 3C. The SAMS system will then look at the requested arrival times, overlay them on the model 300 it already contains and seek to build the most efficient sequence. Efficiency is achieved by creating an optimal balance between the requested TATs and the number of packages of grouped wake vortex types. The final pattern will provide a sensible balance between the potential for delays on ground and maximising the overall efficiency of the system through reduced holding periods and increased movements. To enable this balance to be achieved it is necessary to consider the effect of the allocated TAT on the total block time of the individual flight, and then reduce the amount of total holding delay and verify that the grouping of aircraft into "packets" of like vortex type enables the increased movement rate (i.e. increased number of landings) to be achieved for the airport.

Figure 3D:
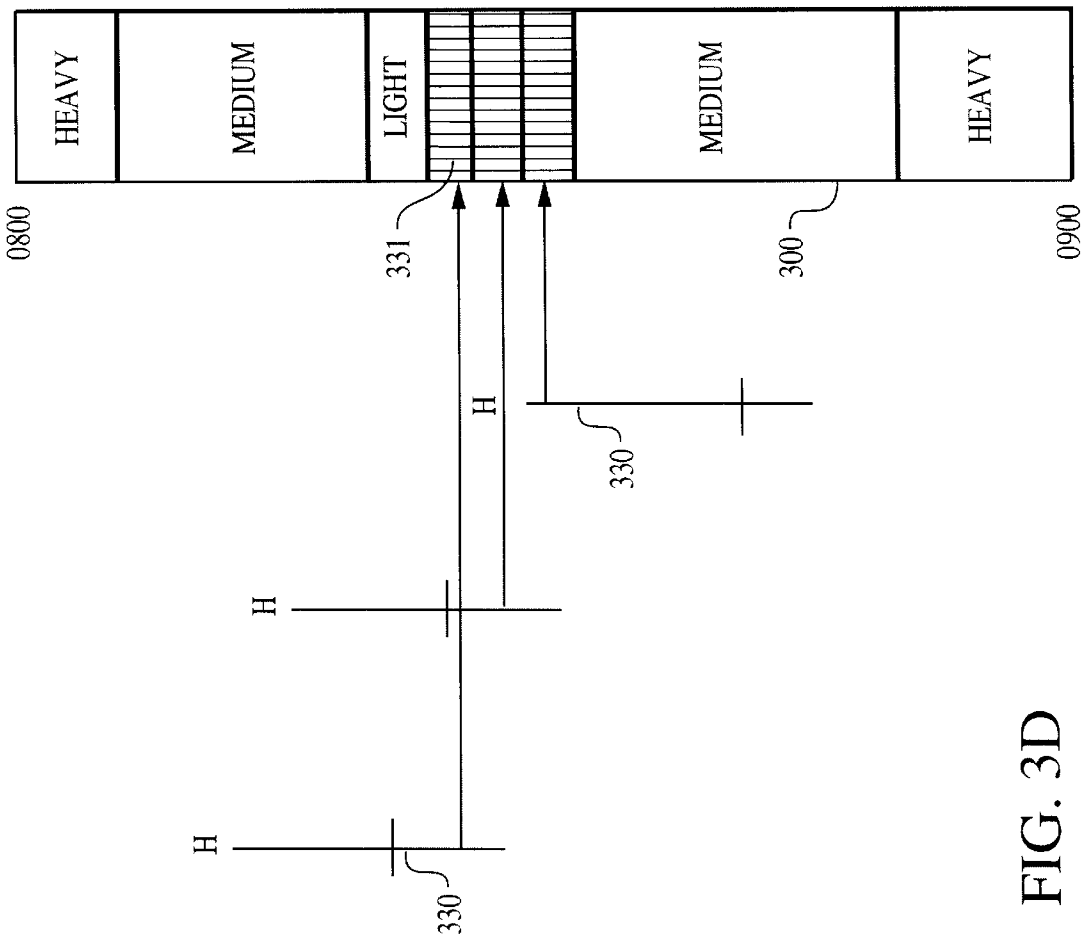
Figure 3E:
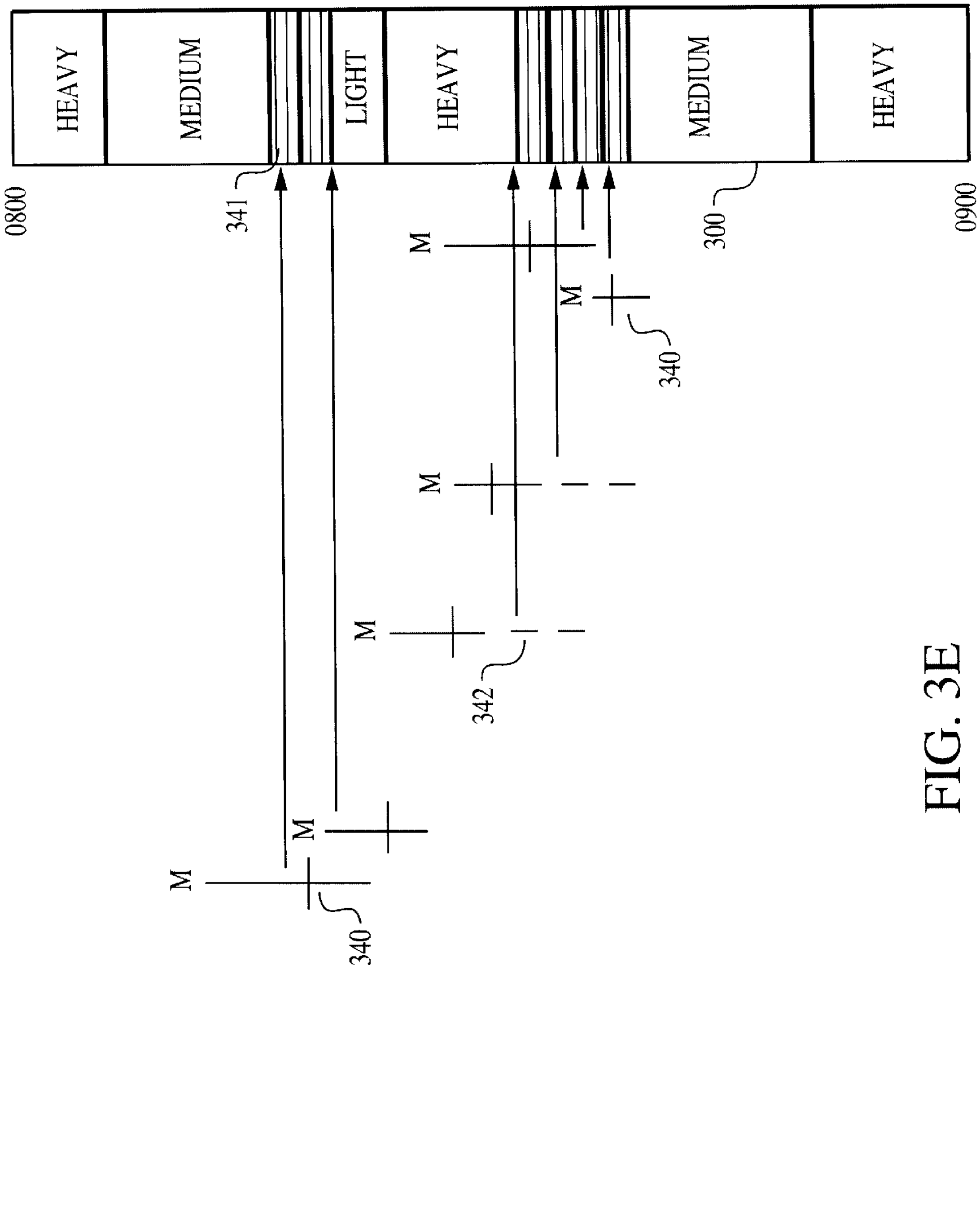
Figure 3F:
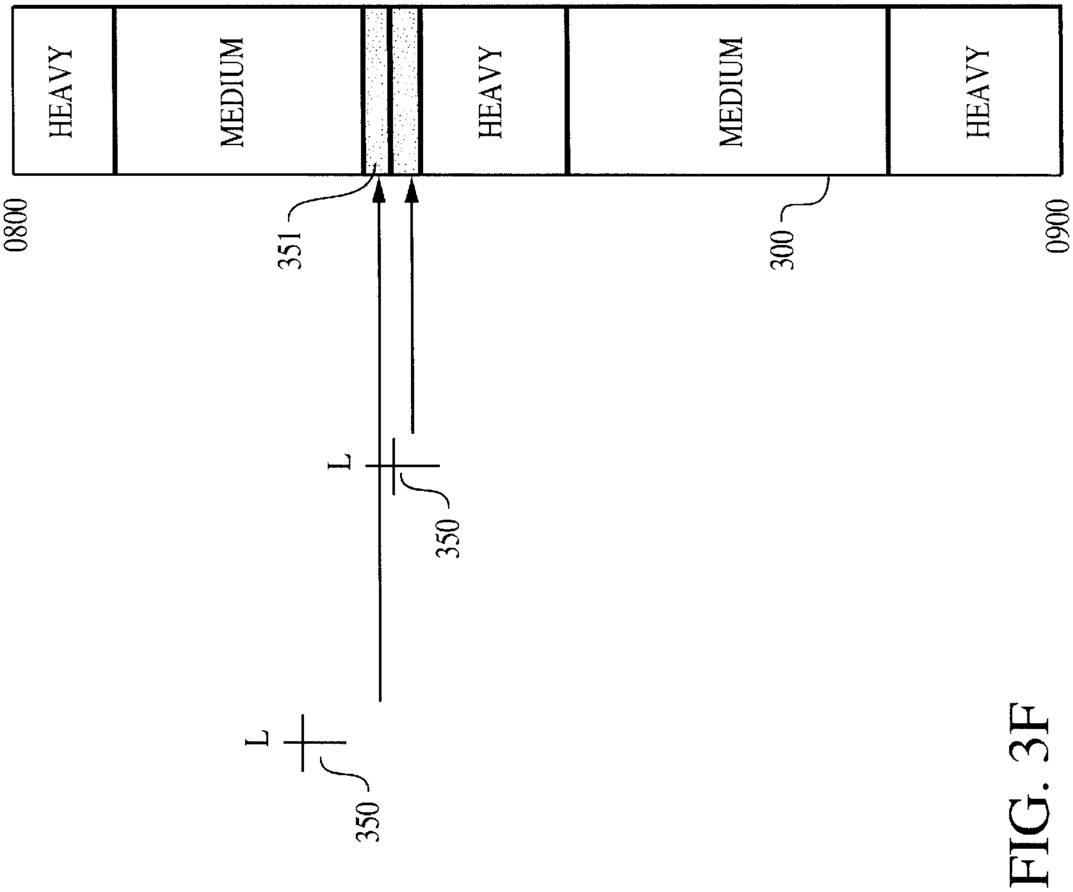

FIGS. 3D, 3E and 3F, respectively, show how the TAT request and flexibility information and vortex type for aircraft arriving in a time period (0800 to 0900) are used to assign TATs, respectively, for aircraft of vortex type heavy, medium and light. FIG. 3D shows the "Heavy" aircraft 330 from the illustrative sample shown in FIG. 3C. In this example there are three "Heavy" aircraft, and each are allocated TATs 331 in the "Heavy" wake vortex block in the model 300. Note that the assigned TATs are different from the requested TATs. The TAT allocations 341 for a half dozen "Medium" aircraft are shown in FIG. 3E, derived from the information 340 provided by the airline. Note that in at least one instance 342 the TAT provided in order to include the flight within an appropriate wake vortex grouping was not within the indicated flexibility range, as shown by a broken line extension of the flexibility range. FIG. 3F shows how the "Light" aircraft 350 from the sample shown in FIG. 3C are allocated TATs 351 within a "Light" wake vortex block.

Figure 3G:
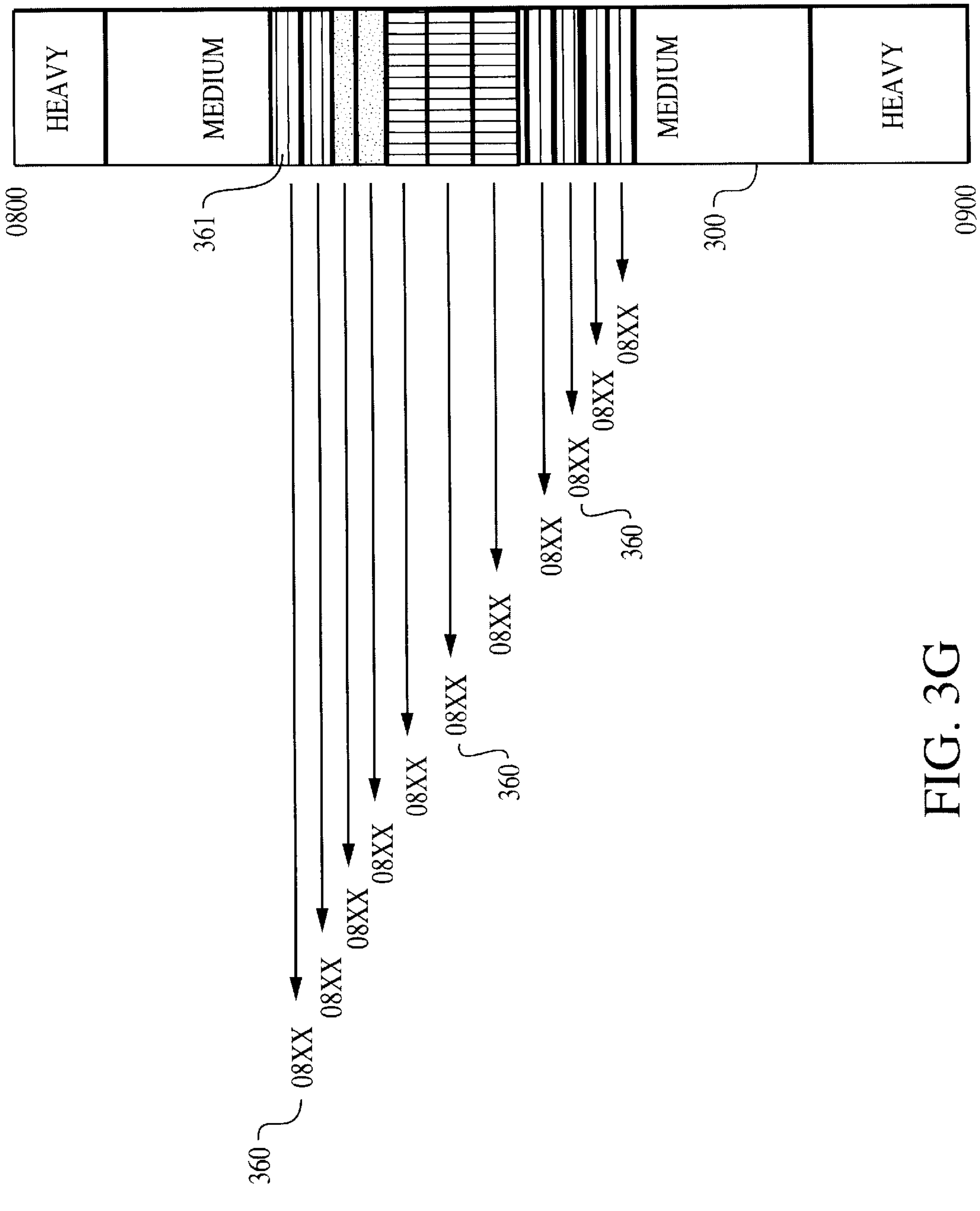

FIG. 3G illustrates the issuance back to the airlines or operators of the TATs 361 that have been built up as described in FIGS. 3D, 3E and 3F. The final times 360 issued will take into account the likelihood that there will be some late/early arrivals, which can be managed through the system resilience. It is expected that the system will operate to the required level of efficiency (reduced delays and increased movement rates producing the consequent financial benefits to the airline users of the system) if 80% of flights are able to adhere to a window of plus or minus two minutes around the allocated TAT.

SAMS is robust in its design and takes into account that some aircraft will on occasion arrive early (attempting to create an advantage in the flow pattern), and some will arrive late due to operational reasons, e.g. passenger handling problems. In constructing the TAT schedule this is taken into account by providing slightly more arrivals per rolling hour than the declared capacity of the target runway or airport. Although this could be achieved by a number of methods the suggested method is to create additional TATs not by duplication but by slightly reducing the planned time period between aircraft below the operationally required time i.e. if the normal separation is 1 min 30 sec between aircraft, within the TAT allocation process this might be made 1 min 20 sec. When this 10 second "saving" is compounded throughout the operational day it allows additional TATs to be allocated without allocating any duplicate times.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method for optimizing aircraft arrivals at congested airports, comprising the steps of:

obtaining by an Air Traffic Service Provider (ANSP) basic flight information for all flights scheduled to arrive at an airport during a specified operational period, said basic flight information including for each flight a requested Tactical Arrival Time (TAT) and a flexibility measure for said TAT;

creating from said basic flight information target TATs for each of said flights;

offering said target TATs to airlines controlling said flights;

negotiating with said airlines until acceptance of TATs for said flights;

issuing said TATs, each TAT for a flight being issued prior to departure of said flight.

2. The method of claim 1, wherein said requested TAT is calculated by combining Ground Process Time (GPT) and flight time, said GPT being a sum of taxi time and historical delay time.

3. The method of claim 1, wherein said basic flight information also includes a wake vortex type.

4. The method of claim 3, wherein said creating step includes an additional step of creating provisional TATs for long range arriving aircraft, said provisional TATs being recalculated at a predetermined distance from said airport.

5. The method of claim 4, wherein said provisional TATs are allocated so as to produce contiguous TAT blocks assigned to heavy classification wake vortex flights.

6. The method of claim 5, wherein said provisional allocation takes account of expected short haul traffic.

7. The method of claim 1, wherein said specified operational period is a day.

8. The method of claim 1, wherein for each said flight said obtaining step further comprises one of: receiving said information from an airline, using said information previously provided by said airline, or generating said information from historical data.

9. The method of claim 1, wherein said negotiation includes a measure of departures from requested TATs, such that over time this measure is shared proportionally by said airlines.

10. The method of claim 9, wherein said measure of departures from requested TATs is weighted.

11. A Schedule Activated Management System for optimizing aircraft arrivals at congested airports, comprising:

means for obtaining by an Air Traffic Service Provider (ANSP) basic flight information for all flights scheduled to arrive at an airport during a specified operational period, said basic flight information including for each flight a requested Tactical Arrival Time (TAT) and a flexibility measure for said TAT;

means for creating from said basic flight information target TATs for each of said flights;

means for offering said target TATs to airlines controlling said flights;

means for negotiating with said airlines until acceptance of TATs for said flights;

means for issuing said TATs, each TAT for a flight being issued prior to departure of said flight.

12. The system of claim 11, wherein said requested TAT is calculated by combining Ground Process Time (GPT) and flight time, said GPT being a sum of taxi time and historical delay time.

13. The system of claim 11, wherein said basic flight information also includes a wake vortex type.

14. The system of claim 13, wherein said means for creating includes an additional means for creating provisional TATs for long range arriving aircraft, said provisional TATs being recalculated at a predetermined distance from said airport.

15. The system of claim 14 wherein said provisional TATs are allocated so as to produce contiguous TAT blocks assigned to heavy classification wake vortex flights.

16. The system of claim 15, wherein said provisional allocation takes account of expected short haul traffic.

17. The system of claim 11 wherein said specified operational period is a day.

18. The system of claim 11, wherein for each said flight said means for obtaining further comprises one of: means for receiving said information from an airline, means for using said information previously provided by said airline, and means for generating said information from historical data.

19. The system of claim 11, wherein said negotiation includes a measure of departures from requested TATS, such that over time this measure is shared proportionally by said airlines.

20. The system of claim 19, wherein said measure of departures from requested TATs is weighted.

* * * * *